United States Patent [19]

Joyner et al.

[11] 4,363,908

[45] Dec. 14, 1982

[54] POLYESTER MODIFIED WITH ALKYL- OR ALKENYLSUCCINIC ANHYDRIDES

[75] Inventors: Frederick B. Joyner; Jimmy R. Trotter; Richard L. McConnell, all of Kingsport, Tenn.

[73] Assignee: Eastman Kodak Company, Rochester, N.Y.

[21] Appl. No.: 297,816

[22] Filed: Aug. 31, 1981

[51] Int. Cl.$^3$ ............................................. C08G 63/16
[52] U.S. Cl. ................................... 528/302; 528/295; 528/307; 528/308
[58] Field of Search ................ 528/295, 302, 307, 308

[56] References Cited

U.S. PATENT DOCUMENTS

| | | | |
|---|---|---|---|
| 2,891,930 | 6/1959 | Caldwell et al. | 528/307 |
| 3,033,827 | 5/1962 | Kibler et al. | 528/307 X |
| 3,076,787 | 12/1963 | Johnson et al. | 528/308 X |
| 3,932,358 | 1/1976 | de Cleur et al. | 528/308 X |
| 4,122,073 | 10/1978 | Georgoudis | 28/302 X |
| 4,124,571 | 11/1978 | Georgoudis | 28/302 X |
| 4,252,940 | 2/1981 | Sublett | 528/302 |

*Primary Examiner*—Lucille M. Phynes
*Attorney, Agent, or Firm*—William P. Heath, Jr.; Daniel B. Reece, III

[57] ABSTRACT

Linear copolyesters derived from at least 65 mole % of 1,4-cyclohexanedicarboxylic acid moiety of which at least 85 mole % thereof is of the trans configuration; 0 to 33 mole % of an aromatic, cycloaliphatic or aliphatic dibasic acid moiety, 2 to 35 mole % of an alkylsuccinic or alkenylsuccinic anhydride moiety and one or more aliphatic or cycloaliphatic glycol moieties. The copolyesters are useful as bonding or coating compositions.

5 Claims, No Drawings

POLYESTER MODIFIED WITH ALKYL- OR ALKENYLSUCCINIC ANHYDRIDES

FIELD OF THE INVENTION

This invention is a class of new, linear copolyesters which contain about 2 mole % or more of one or more alkylsuccinic anhydrides or alkenylsuccinic anhydrides which are chemically combined in the polyester molecule. The copolyesters generally contain crystallizable moieties with crystalline melting points of about 90° C. to about 200° C. These copolyesters are useful as coatings or as adhesives for bonding fabrics, metals, plastics, wood and the like.

BACKGROUND ART

U.S. Pat. No. 3,542,737 discloses poly(ethylene terephthalate) polymers containing up to 15 mole percent of a substituted succinic anhydride, the polymers being useful to produce high melting films and fibers. U.S. Pat. No. 3,890,279 discloses thermoplastic copolyester elastomers derived from terephthalic acid or 2,6-naphthalenedicarboxylic acid, an alkyl or alkenylsuccinic anhydride (side chain=7 to 30 carbon atoms) and 1,4 butanediol. U.S. Pat. No. 3,891,604 discloses segmented thermoplastic copolyetheresters derived from poly(tetramethylene ether)glycol, glycols containing 2 to 8 carbon atoms, alkyl or alkenyl succinic anhydrides and $C_8$ to $C_{16}$ aromatic dicarboxylic acids.

DISCLOSURE OF THE INVENTION

This invention is a composition comprising copolyesters having a melting point of about 90° C. to about 200° C. and an inherent viscosity of about 0.4 to about 1.2, said copolyester containing the following divalent radicals:

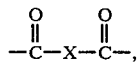 (A)

at least one of —O—Y—O— and  (B)
—O—CH₂—CH₂—O—CH₂—CH₂—O—, and

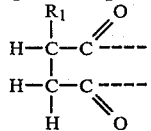 (C)

wherein X is comprised of at least 65 to 98 mole % of the divalent 1,4-cyclohexylene radical with at least 85 mole % thereof giving the trans configuration and 0 to 35 mole % of at least one divalent radical selected from other divalent cycloaliphatic radicals or from divalent aromatic radicals containing 6 to 12 carbon atoms, and from primary aliphatic hydrocarbon radicals containing 2 to 34 carbon atoms, Y is a divalent aliphatic or cycloaliphatic radical containing 2 to 8 carbon atoms, $R_1$ is a radical containing at least 3 carbon atoms, and wherein said copolyester is further characterized in that radical (A) is present in the amount of about 98 to about 65 mole percent and radical (C) is present in the amount of about 2 to about 35 mole percent.

These new copolyesters are readily prepared using typical polycondensation reaction conditions. They may be prepared by either batch or continuous processes.

Typical polyesterification catalysts which may be used include titanium alkoxides, dibutyl tin dilaurate, and combinations of zinc, manganese, or magnesium acetates or benzoates with antimony oxide or antimony triacetate.

Useful polymers may have inherent viscosities ranging from about 0.4 to about 1.2, but preferred polymers have I.V. values ranging from about 0.5 to about 1.1. Inherent viscosities are determined at 25° C. in a 60/40 weight mixture of phenol/tetrachloroethane at a concentration of 0.5 g./100 ml.

We have found that it is generally possible to include from about 2 to about 35 mole percent of the alkyl or alkenylsuccinic anhydride in the polyesters of this invention. Preferred concentrations of the succinic anhydrides would include from about 3 to about 30 mole percent.

One of the advantages of the polyesters of our invention is that they can be used to bond fabrics at relatively low temperatures and the bonded fabrics have good resistance to typical laundering procedures. Also the copolyesters have much lower melt viscosities than similar polyesters which do not contain the substituted succinic anhydride moieties.

In the bonding of fabrics and other substrates with polyester polymers, it is critical that the polymers melt in a desirable range, maintain a certain level of crystallinity and crystallize in a relatively short period of time, for example in less than about 8 minutes. It has been found that certain copolyesters containing at least about 65 mole % of 1,4-cyclohexanedicarboxylic acid have these desirable properties provided that at least 85% of the 1,4-cyclohexanedicarboxylic acid is in the trans configuration. Preferred copolyesters based on 1,4-cyclohexanedicarboxylic acid and alkylsuccinic anhydrides generally have melting points in the 90° C. to 200° C. range and have heats of fusion in the range of about 1 to about 10 calories/gram.

The copolyesters may be used in powder form for fusible interlining fabrics, applied in hot melt form from extruders or gear pump applicators, or extruded into film or fiber form for use in laminating or bonding substrates. The copolyesters may also be melt blown into nonwoven webs which may be used to laminate fabrics or other articles.

Substituted succinic anhydrides useful in our invention include those containing straight chain or branched chain alkyl or alkenyl groups containing 3 to about 30 carbon atoms. For example, useful succinic anhydrides include propylsuccinic anhydride, octylsuccinic anhydride, octenylsuccinic anhydride, isooctylsuccinic anhydride, dodecylsuccinic anhydride, octadecylsuccinic anhydride, octadecylsuccinic anhydride, triacontylsuccinic anhydride, and the like.

The copolyesters of this invention also contain suitable amounts of aromatic, cycloaliphatic or aliphatic dibasic acids and one or more selected aliphatic or cycloaliphatic glycols. Dibasic acids suitable for use in our invention include at least 65 mole % 1,4-cyclohexanedicarboxylic with at least 85 % trans configuration, 1,3-cyclohexanedicarboxylic, 1,2-cyclohexanedicarboxylic, glutaric, adipic, pimelic, suberic, azelaic, sebacic, 1,12-dodecanedioic, dimer acid, and the like.

Glycols useful in our invention include ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, and the like.

This invention will be further illustrated by the following examples although it will be understood that these examples are included merely for purposes of illustration and are not intended to limit the scope of the invention.

These examples describe the preparation of copolymers of our invention and some of the uses for which the copolymers are particularly suited.

EXAMPLE 1

A total of 90 grams (0.45 mole) of trans dimethyl 1,4-cyclohexanedicarboxylate, 67.5 grams (0.75 mole) of 1,4-butanediol, 10.6 grams (0.05 mole) of octylsuccinic anhydride, and 100 ppm of titanium catalyst (titanium isopropoxide in n-butanol) are weighed into a 500 ml. single-neck round-bottom flask equipped with a nitrogen inlet, stirrer, vacuum outlet, and a condensing flask. The flask is heated at 200° C. in a Belmont metal bath for one hour with a nitrogen sweep over the reaction mixture. After one hour, the temperature of the bath is increased to 210° C. for one hour and 25 minutes. When the theoretical amount of methanol has distilled from the reaction mixture, the metal bath temperature is increased to 250° C. and the pressure in the flask is reduced to about 0.1 mm. of mercury. The flask is heated at 250° C. at about 0.1 mm. pressure for 1 hour and 20 minutes. The flask is then removed from the bath and is allowed to cool under a nitrogen atmosphere as the polyester crystallizes. The polymer contains 10 mole % octylsuccinic anhydride moiety. The polymer is an opaque, white color and has an I.V. of 0.62.

The polymer has a Brookfield Thermosel melt viscosity of 15,375 cp. at 215° C. By DSC analysis, the polymer has a melting point ($T_m$) of 153° C. [heat of fusion ($\Delta H_f$) is 9.8 cal./g.]

Films (4 mils thick) of the material are melt pressed using a heated Wabash Press at 200° C. The films are used to bond 65/35 polyester/cotton fabric (twill weave) using a Sentinel heat sealer at 175° C. and 15 psi. for 2 seconds. The bonded specimens have an initial T-peel strength of 8.7 lb./in.-width [measured at 23° C. (after bonds have aged for 25 hours at 23° C.) using a peel rate of two inches per minute].

EXAMPLE 2

The procedure of Example 1 is repeated except that 17.6 grams (0.05 mole) of octadecylsuccinic anhydride is used instead of octylsuccinic anhydride to prepare the copolyester. The copolymer contains 10 mole % octadecylsuccinic anhydride moiety. The polymer is an opaque, white color. It has an I.V. of 0.55 and a Brookfield Thermosel melt viscosity of 7000 cp. at 215° C. By DSC analysis, the copolyester has a melting point of 150° C. ($\Delta H_f = 9.0$ cal./g.). Fabric bonds (bonding conditions = 175° C./2 sec./15 psi.) made with films of this copolymer have T-peel strengths of 3.3 lb./in.-width.

EXAMPLE 3

The procedure of Example 1 is repeated except that 90 grams (0.45 mole) of trans dimethyl 1,4-cyclohexanedicarboxylate, 17.6 grams (0.05 mole) of octadecylsuccinic anhydride, 63 grams (0.70 mole) of 1,4-butanediol, and 31.2 grams (0.30 mole) of 1,5-pentanediol are used to prepare the copolyester. The copolyester contains 90 mole % trans 1,4-cyclohexanedicarboxylic acid moiety, 10 mole % octadecylsuccinic anhydride moiety, 66 mole % 1,4-butanediol moiety and 34 mole % 1,5-pentanediol moiety. The polymer is an opaque, white color. It has an I.V. of 0.60 and a Brookfield Thermosel melt viscosity of 8750 cp. at 215° C. By DSC analysis, the copolyester has a melting point of 104° C. ($\Delta H_f = 5.4$ cal./g.). Fabric bonds (bonding conditions = 125° C./2 sec./15 psi.) made with films of this copolymer have T-peel strengths of 5.1 lb./in.-width.

EXAMPLE 4

The procedure of Example 1 is repeated except that 48.5 grams (0.2425 mole) of trans dimethyl 1,4-cyclohexanedicarboxylate, 1.59 grams (0.0075 mole) of octylsuccinic anhydride, 31.5 grams (0.35 mole) of 1,4-butanediol, and 17.7 grams (0.15 mole) of 1,6-hexanediol are used to prepare the copolyester. The copolyester contains 97 mole % trans 1,4-cyclohexanedicarboxylic acid moiety, 3 mole % octylsuccinic anhydride moiety, 66 mole % 1,4-butanediol moiety, and 34 mole % 1,6-hexanediol moiety. The polymer is an opaque, white color. It has an I.V. of 0.64. By DSC analysis, the copolyester has a melting point of 117° C. ($\Delta H_f = 7.0$ cal./g.). Fabric bonds (bonding conditions = 150° C./2 sec./15 psi.) made with films of this copolymer have T-peel strengths of 3.1 lb./in.-width.

EXAMPLE 5

The procedure of Example 1 is repeated except that 35 grams (0.175 mole) of trans dimethyl 1,4-cyclohexanedicarboxylate, 8 grams (0.05 mole) of dimethyl glutarate, 6.7 grams (0.025 mole) of dodecylsuccinic anhydride, and 39.37 grams (0.4375 mole) of 1,4-butanediol are used to prepare the copolyester. The polymer contains 70 mole % trans 1,4-cyclohexanedicarboxylic acid moiety, 20 mole % glutaric acid moiety, 10 mole % dodecylsuccinic anhydride moiety and 100 mole % 1,4-butanediol moiety. The polymer is an opaque, white color. It has an I.V. of 1.19. By DSC analysis, the copolyester has a melting point of 112° C. ($\Delta H_f = 4.7$ cal./g.). Fabric bonds (bonding conditions = 175° C./2 sec./15 psi.) made with films of this copolymer have T-peel strengths of 17.7 lb./in.-width.

EXAMPLE 6

The procedure of Example 1 is repeated except that 45 grams (0.225 mole) of trans dimethyl 1,4-cyclohexanedicarboxylate, 6.7 grams (0.025 mole) of dodecylsuccinic anhydride, and 33.75 grams (0.375 mole) of 1,4-butanediol are used to prepare the copolyester. The polymer contains 90 mole % trans 1,4-cyclohexanedicarboxylic acid moiety, 10 mole % dodecylsuccinic anhydride moiety, and 100 mole % 1,4-butanediol moiety. The polymer has an I.V. of 0.58. By DSC analysis, the polymer has a melting point of 150° C. ($\Delta H_f = 9.2$ cal./g.). Films of the polymer are useful in bonding polyester/cotton fabric.

EXAMPLE 7

The procedure of Example 1 is repeated except that 35 grams (0.175 mole) of trans dimethyl 1,4-cyclohexanedicarboxylate, 8 grams (0.05 mole) of dimethyl glutarate, 8.8 grams (0.025 mole) of octadecylsuccinic anhydride, and 33.75 grams (0.375 mole) of 1,4-butanediol are used to prepare the copolyester. The polymer contains 70 mole % trans cyclohexanedicarboxylic acid moiety, 20 mole % glutaric acid moiety, 10 mole % octadecylsuccinic anhydride moiety, and 100 mole % 1,4-butanediol moiety. The polymer has an I.V. of 0.96 and a melting point, by DSC analysis, of 121° C.

($\Delta H_f$=6.7 cal./g.). Films of the polymer are useful in bonding polyester/cotton fabrics.

EXAMPLE 8

The procedure of Example 1 is repeated except that a copolyester containing 68 mole % of trans 1,4-cyclohexanedicarboxylic acid moiety, 32 mole % of dodecylsuccinic anhydride moiety, and 100 mole % of ethylene glycol moiety is prepared. The copolyester is an opaque, white color and has an I.V. of 0.4. By DSC analysis, the copolyester has a melting point of 121° C. Film of the polymer are useful in bonding polyester/cotton fabric.

EXAMPLE 9

The procedure of Example 1 is repeated except that a copolyester containing 80 mole % of a 95/5 trans/cis mixture of 1,4-cyclohexanedicarboxylic acid moiety, 20 mole % of octadecylsuccinic anhydride moiety, and 100 mole % of 1,4-butanediol moiety is prepared. The copolyester is an opaque, white color and it has an I.V. of 0.83. By DSC analysis the copolyester has a melting point of 119° C. ($\Delta H_f$=5.4 cal./g.) and crystallizes in less than 3 minutes. Films of the polyester are useful in bonding polyester/cotton fabric.

EXAMPLE 10

The procedure of Example 1 is repeated except that a copolyester containing 80 mole % of an 85/15 trans/cis mixture of 1,4-cyclohexanedicarboxylic acid moiety, 20 mole % of octadecylsuccinic anhydride moiety, and 100 mole % of 1,4-butanediol moiety is prepared. The copolyester is an opaque, white color and has an I.V. of 0.41. By DSC analysis, the copolyester has a melting point of 100° C. ($\Delta H_f$=5.8 cal./g.) and crystallizes in less than 5 minutes. Films of the copolyester are useful in bonding polyester/cotton fabric.

EXAMPLE 11

The procedure of Example 1 is repeated except that a copolyester containing 80 mole % of a 75/25 trans/cis mixture of 1,4-cyclohexanedicarboxylic acid moiety, 20 mole % of octadecylsuccinic anhydride moiety, and 100 mole % of 1,4-butanediol moiety is prepared. The copolyester is an opaque, white color and has an I.V. of 0.4. By DSC analysis, the copolyester has a melting point of 87° C. ($\Delta H_f$=3.2 cal./g.) and crystallizes in greater than 10 minutes. This slow crystallization rate deleteriously affects the use of this polyester as an adhesive.

In this invention the amount of a given constituent of a polymer is expressed as mole % of total acid moiety or mole % of total glycol moiety present.

The invention has been described in detail with particular reference to preferred embodiments thereof, but it will be understood that variations and modifications can be effected within the spirit and scope of the invention.

We claim:

1. A composition comprising a copolyester having a melting point of about 90° C. to about 200° C. and an inherent viscosity of about 0.4 to about 1.2, said copolyester containing the following divalent radicals:

$$-\overset{O}{\underset{}{C}}-X-\overset{O}{\underset{}{C}}-, \quad (A)$$

at least one of $-O-Y-O-$ and (B)
$-O-CH_2-CH_2-O-CH_2-CH_2-O-$, and

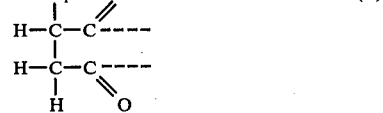
(C)

wherein X is comprised of at least 65 mole % of the divalent 1,4-cyclohexylene radical with at least 85 mole % thereof giving the trans configuration and 0 and 35 mole % of at least one divalent radical selected from other divalent cycloaliphatic radicals or from divalent aromatic radicals containing 6 to 12 carbon atoms, and from primary aliphatic hydrocarbon radicals containing 2 to 34 carbon atoms, Y is a divalent aliphatic or cycloaliphatic radical containing 2 to 8 carbon atoms, $R_1$ is a radical containing at least 3 carbon atoms, and wherein said copolyester is further characterized in that radical (A) is present in the amount of about 98 to about 65 mole percent and radical (C) is present in the amount of about 2 to about 35 mole percent.

2. Composition of claim 1 wherein radical (C) is present in the amount of about 3 to about 30 mole percent.

3. Composition of claim 2 wherein radical (C) is present in the amount of about 5 to 20 mole percent.

4. Composition of claim 1 wherein $R_1$ is a radical containing 8 to 18 carbon atoms.

5. Composition of claim 1 wherein X is at least 80 mole percent of the divalent 1,4-cyclohexylene radical giving the trans configuration.

* * * * *